(12) United States Patent
Day, III et al.

(10) Patent No.: US 6,502,108 B1
(45) Date of Patent: Dec. 31, 2002

(54) CACHE-FAILURE-TOLERANT DATA STORAGE SYSTEM STORING DATA OBJECTS WITH VERSION CODE EQUIPPED METADATA TOKENS

(75) Inventors: Kenneth Fairclough Day, III, Tucson, AZ (US); Douglas William Dewey, Tucson, AZ (US); Gregory Tad Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/426,449

(22) Filed: Oct. 25, 1999

(51) Int. Cl.[7] ............................................. G06F 12/00
(52) U.S. Cl. ...................................... 707/203; 711/113
(58) Field of Search ............................... 707/1–2, 6–10, 707/100, 103, 104, 201–206; 711/100–101, 108–135, 138, 161, 162

(56) References Cited

U.S. PATENT DOCUMENTS 6,073,139 A  *  6/2000  Jain et al. ..................... 707/203
6,151,607 A  * 11/2000  Lomet ......................... 707/202
6,289,358 B1 *  9/2001  Mattis et al. ................. 707/203
6,314,417 B1 * 11/2001  Bennett et al. ............... 707/2

* cited by examiner

*Primary Examiner*—Alford W. Kindred
(74) *Attorney, Agent, or Firm*—Dan Hubert & Assoc.

(57) ABSTRACT

A data storage system stores data with a corresponding encapsulated metadata token in cache and/or base storage to protect against recalling stale data from base storage in the event of a cache failure and subsequent cache miss. A controller is coupled to a cache, base storage, and token database. After receiving a data object and associated write request, the controller assigns a version code to the data object. If the data object already exists, the controller advances the data object's version code. A token, including the version code along with other items of metadata, is encapsulated for storage. Then, the controller stores the data object and encapsulated token in cache and/or base storage and updates the token database to cross-reference the data object with its version code. When the controller experiences a cache miss, there is danger in blindly retrieving the data object from base storage since the cache miss may have occurred due to cache failure before the data was de-staged, leaving a down-level version of the data object on base storage. This problem is avoided by comparing the data object's version code contained in base storage to the version code listed for the data object in the token database. Only if the compared version codes match, the data object is read from base storage and provided as output.

32 Claims, 3 Drawing Sheets

CACHE-FAILURE-TOLERANT DATA STORAGE SYSTEM STORING DATA OBJECTS WITH VERSION CODE EQUIPPED METADATA TOKENS

BACKGROUND OF THE INVENTION

1. Field of the Invention

The present invention relates to data storage systems that utilize tape or other base storage along with high speed cache. More particularly, the invention concerns a data storage system that stores data objects with encapsulated metadata tokens in cache and/or base storage to protect against recalling stale data from base storage in the event of a cache failure.

2. Description of the Related Art

Many data processing systems require a large amount of data storage, for use in efficiently accessing, modifying, and re-storing data. Data storage is typically separated into several different levels, each level exhibiting a different data access time or data storage cost. A first, or highest level of data storage involves electronic memory, usually dynamic or static random access memory (DRAM or SRAM). Electronic memories take the form of semiconductor integrated circuits where millions of bytes of data can be stored on each circuit, with access to such bytes of data measured in nanoseconds. The electronic memory provides the fastest access to data since access is entirely electronic.

A second level of data storage usually involves direct access storage devices (DASD). DASD storage, for example, includes magnetic and/or optical disks. Data bits are stored as micrometer-sized magnetically or optically altered spots on a disk surface, representing the "ones" and "zeros" that comprise the binary value of the data bits. Magnetic DASD includes one or more disks that are coated with remnant magnetic material. The disks are rotatably mounted within a protected environment. Each disk is divided into many concentric tracks, or closely spaced circles. The data is stored serially, bit by bit, along each track. An access mechanism, known as a head disk assembly (HDA) typically includes one or more read/write heads, and is provided in each DASD for moving across the tracks to transfer the data to and from the surface of the disks as the disks are rotated past the read/write heads. DASDs can store gigabytes of data, and the access to such data is typically measured in milliseconds (orders of magnitudes slower than electronic memory). Access to data stored on DASD is slower than electronic memory due to the need to physically position the disk and HDA to the desired data storage location.

A third or lower level of data storage includes tapes, tape libraries, and optical disk libraries. Access to library data is much slower than electronic or DASD storage because a robot or human is necessary to select and load the needed data storage medium. An advantage of these storage systems is the reduced cost for very large data storage capabilities, on the order of Terabytes of data. Tape storage is often used for backup purposes. That is, data stored at the higher levels of data storage hierarchy is reproduced for safe keeping on magnetic tape. Access to data stored on tape and/or in a library is presently on the order of seconds.

Data storage, then, can be conducted using different types of storage, where each type exhibits a different data access time or data storage cost. Rather than using one storage type to the exclusion of others, many data storage systems include several different types of storage together, and enjoy the diverse benefits of the various storage types. For example, one popular arrangement employs an inexpensive medium such as tape to store the bulk of data, while using a fast-access storage such as DASD to cache the most frequently or recently used data.

During normal operations, synchronization between cache and tape is not all that important. If a data object is used frequently, it is stored in cache and that copy is used exclusively to satisfy host read requests, regardless of whether the data also resides in tape. Synchronization can be problematic, however, if the cache and tape copies of a data object diverge over time and the data storage system suffers a disaster. In this case, the cache and tape contain different versions of the data object, with one version being current and the other being outdated. But, which is which? In some cases, there may be some confusion as to which version of the data object is current. At worst, a stale or "down-level" version of a data object may be mistaken (and subsequently used) as the current version. Thus, in the event of cache failure, data integrity may be questionable and there is some risk of the data storage system incorrectly executing future host read requests by recalling a stale version of the data.

SUMMARY OF THE INVENTION

Broadly, the present invention concerns a cache-equipped data storage system that stores data objects with encapsulated metadata tokens to protect against recalling stale data from base storage in the event of a cache failure. The storage system includes a controller coupled to a cache, base storage, and token database. The controller may be coupled to a hierarchically superior director or host.

When a data object is received for storage, the controller assigns a version code for the data object if the data object is new to the system; if the data object already exists, the controller advances the data object's version code. A "token," made up of various items of metadata including the version code, is encapsulated for storage with its corresponding data object. The controller then stores the encapsulated token along with its data object and updates the token database to cross-reference the data object with its token. Thus, the token database always lists the most recent version code for each data object in the system.

The data object may be copied from cache to base storage automatically, de-staged from cache to base storage based on lack of frequent or recent use, or according to another desired schedule. Whenever the controller experiences a cache miss, there is danger in blindly retrieving the data object from base storage. In particular, the cache miss may have occurred due to failure of part or all of the cache, and at the time of cache failure the base storage might have contained a down-level version of the data object. The present invention solves this problem by comparing the version code of the data object from base storage to the version code of the data object in the token database. Only if the compared version codes match is the data object read from storage and provided as output. Otherwise, an error message is generated since the data object is stale.

As a further enhancement, the invention may utilize a "split" version code, where the version code has a data subpart and properties subpart. The data subpart is advanced solely to track changes to the data, while the properties subpart is advanced according to changes in attributes of the data object other than the data itself. In this embodiment, when the data object's version code from base storage is examined after a cache miss, the data subpart is reviewed without regard to the properties subpart. This avoids the situation where, although the base storage contains a current version of data, this data object would be regarded as stale because a non-split version code that does not make any data/properties differentiation has been advanced due to a change in the data object's properties not affecting the data itself. Accordingly, with this feature, data objects from base storage are more frequently available to satisfy cache misses.

Accordingly, as discussed above, one embodiment of the invention involves a method of operating a cache-equipped data storage system. In another embodiment, the invention may be implemented to provide an apparatus, such as a data storage system configured as discussed herein. In still another embodiment, the invention may be implemented to provide a signal-bearing medium tangibly embodying a program of machine-readable instructions executable by a digital data processing apparatus to perform operations for operating a data storage system. Another embodiment concerns logic circuitry having multiple interconnected electrically conductive elements configured to perform operations as discussed above.

The invention affords its users with a number of distinct advantages. For example, in the event of a cache miss resulting from unintentional loss of the cached data, the invention avoids unknowingly recalling a down-level data object from base storage. Thus, the invention helps ensure data integrity. Furthermore, in the event of a cache miss, the invention increases data availability by using "split" version codes. Despite any changes to the data's properties that still leave the data intact, the data object is still available for retrieval if the data subpart of its version code is still current according to the token database. The invention also provides a number of other advantages and benefits, which should be apparent from the following description of the invention.

DETAILED DESCRIPTION

Figure 1:
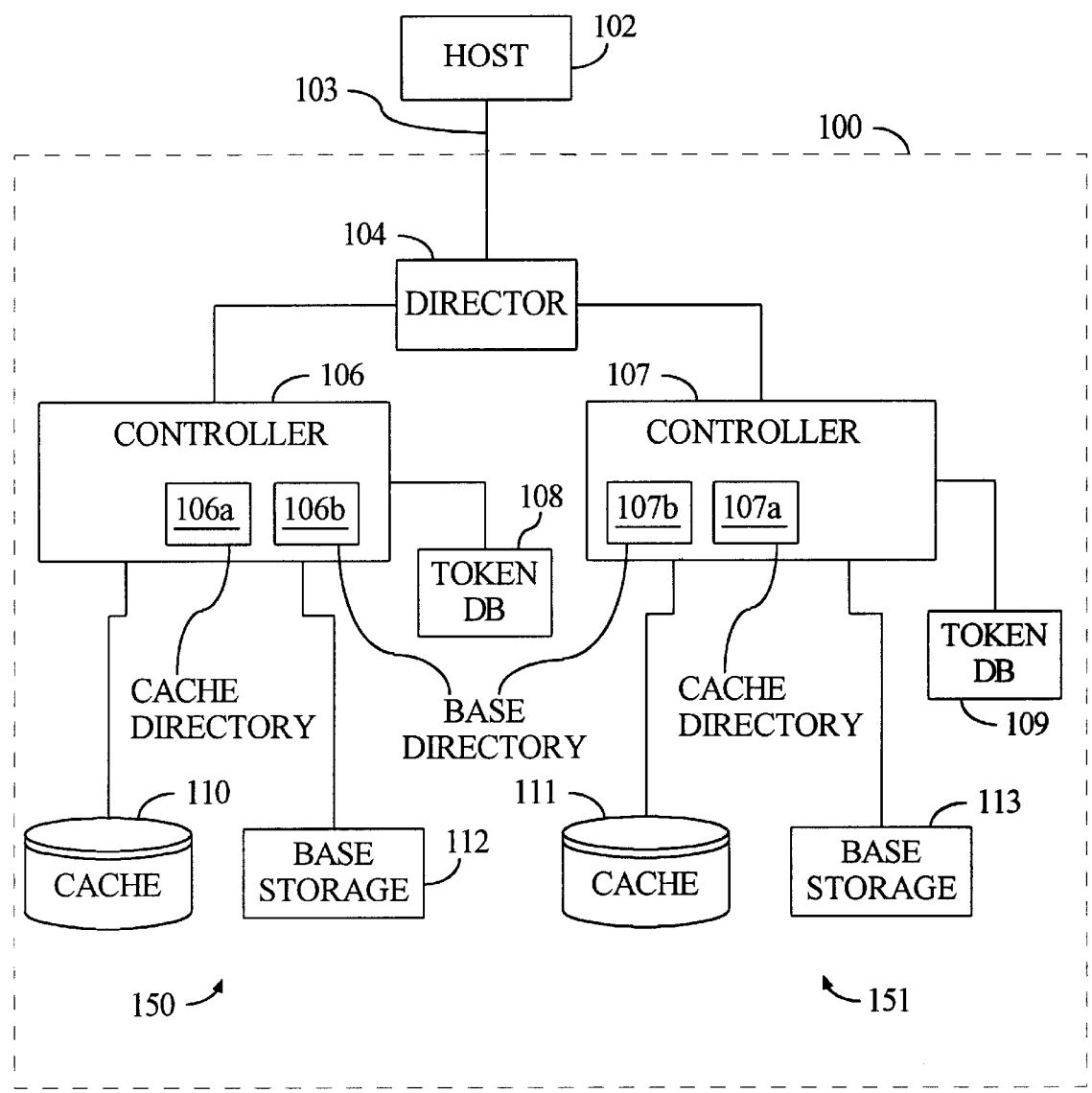
FIG. 1 is a block diagram of the hardware components and interconnections of a data storage system according to the invention.

The nature, objectives, and advantages of the invention will become more apparent to those skilled in the art after considering the following detailed description in connection with the accompanying drawings.

Hardware Components & Interconnections

Introduction

One aspect of the invention concerns a data storage system, which may be embodied by various hardware components and interconnections. One example is described by the data storage system 100 of FIG. 1. As explained in greater detail below, the data storage system 100 stores data in base storage, and also utilizes a cache to more quickly access the more frequently or recently used data objects. In this particular example, the system 100 uses redundant storage, where one copy of data is used for read/write access and the other copy is used as a backup for disaster recovery. The data storage system 100 includes a director 104, which is coupled to two storage sites, including a primary site 150 and a backup site 151. Although two storage sites are shown in this example, a greater or lesser number may be used if desired.

Host

The data storage system 100 is coupled to a host 102. Among other possible functions, the host 102 supplies data to the system 100 for storage therein and sends requests to the system 100 to retrieve data therefrom. The host role may be satisfied by various types of hardware, such as a digital data processing computer, logic circuit, construction of discrete circuit components, interface to a human operator, etc. As an example, the host 102 may comprise an IBM ES/9000 machine employing an operating system such as MVS.

Director

The storage director 104 relays host data storage/retrieval requests to hierarchically inferior components that carry out the requests. In the illustrated example, the director 104 also synchronizes data exchanges between redundant primary and backup storage sites 150–151.

The director 104 communicates with the host 102 by an interface 103 such as wires/cables, one or more busses, fiber optic lines, wireless transmission, intelligent communications channel, etc. As an example, the interface 103 may comprise an ESCON connection. The director 104 comprises a digital data processing machine, logic circuit, construction of discrete circuit components, or other automated mechanism for managing storage operations in the system 100. The director 104 operates according to programming or other configuration, as discussed in greater detail below. To provide a specific example, the director 104 may comprise an external RS/6000 component attached to a commercially available IBM Virtual Tape Server ("VTS") product.

If one of the storage sites 150–151 is omitted to save costs and provide non-redundant storage, the director 104 may also be omitted, and its function performed by one or both of the remaining controllers 106–107.

Controller

The data storage system 100 also includes primary and backup controllers 106–107, which are coupled to the director 104. According to instructions from the director 104, the controllers 106–107 manage local storage operations conducted on respective cache 110–111 111 and base 112–113 storage units. The controllers 106–107 communicate with the director 104 by interfaces such as wires/cables, one or more busses, fiber optic lines, wireless transmission, intelligent communications channel, etc.

Each controller 106–107 comprises a digital data processing machine, logic circuit, construction of discrete circuit components, or other automated mechanism for managing storage operations in the system 100, and operates according to suitable programming, physical configuration, etc. To provide a specific example, each controller 106–107 may comprise an RS/6000 component of a commercially available IBM VTS product.

The controllers 106–107 also include respective cache directories 106a–107a. Each controller's cache directory lists the data objects residing in that controller's cache 110–111. The cache directories may list data objects by various means, such as name, volser, and/or certain metadata such as the data object's anywhere token, certain file attributes, etc. The controllers 106–107 may also include base directories 106b–107b listing contents of their respective base storage 112–113, or such directories may be stored on base storage instead.

Other Components of the Storage Sites

In addition to the controllers 106–107, each storage site includes a cache 110–111, base storage 112–113, and token database 108–109. The cache units 110–111 comprise high-speed storage devices to efficiently store and retrieve the most likely, most frequently, or most recently used data objects in the system 100. Although the cache units 110–111 may be implemented with nearly any type of digital data storage, cache preferably utilizes faster storage than would be practical or cost-effective for use as the base storage 112–113. Thus, the cache units 110–111 are best implemented by DASD, electronic memory, or other suitable fast-access storage appropriate to the applicable requirements of cost, access speed, reliability, etc.

In contrast to the cache, each base storage unit 112–113 preferably embodies one or more storage devices including read/write drives that access magnetic, optical, or other removable, serially accessible storage media. The base storage units 112–113 may comprise, for example, one or more IBM model 3590 tape drives with tape media constituting one or more removable magnetic tape cartridges.

Also coupled to the controllers 106–107 are respective token databases 108–109. Each database 108–109 stores machine-readable "tokens." As explained below, each token contains various metadata relating to a data object stored in the cache 110–111 and/or base storage 112–113. As explained below, the data objects are stored with their respective data objects in the cache 110–111 or base storage 112–113. The token databases 108–109 may be stored upon disk, tape, electronic memory, or any desired media, whether physically distinct from the controllers 106–107 (as shown) or not.

Without any intended limitation, TABLE 1 (below) provides an exemplary list of metadata that may be included in each token.

TABLE 1

TOKEN CONTENTS volume serial number ("volser")
split version code, including data subpart and properties subpart
data inconsistent
data in state change
category ("scratch" or "private" tape mount)
director ID
properties in state change
category inconsistent
volume damaged
export pending
import pending
MES flag
properties level As shown in TABLE 1, each token includes a "split version code." Each version code including a "data" subpart and a "properties" subpart, each comprising one level from a predetermined sequence of distinct levels, such as alphabetic, alphanumeric, numeric, or other codes capable of indicating a data object's version. As explained below, the data subpart tracks changes to a data object's underlying data, while the properties subpart tracks changes to non-data properties of the data object. The version code is useful to avoid recalling a stale version of a data subpart from base storage in the event of a cache failure, as explained in greater detail below.

TABLE 2, below, shows several exemplary entries in the token database 108. In this example, each row corresponds to one data object, and each data object is a logical volume. For each data object, TABLE 2 lists the data object's version code data subpart. Although not shown, the version code properties subpart may also be listed if desired.

TABLE 2

TOKEN DATABASE

| DATA OBJECT | VERSION CODE DATA SUBPART |
|---|---|
| Volume 1 | . . . version code 10 . . . |
| Volume 2 | . . . version code 90 . . . |
| Volume 3 | . . . version code 51 . . . |

Redundant Storage

As described above, the present invention may optionally include redundant storage components, such as the backup controller 107, token database 109, cache 111, base storage 113, cache directory 107a, and base directory 107b. In the illustrated example, the controller 106 and its associated storage components may be permanently designated "primary" with the other controller 107 and its storage components being "backup." Alternatively, under a more flexible arrangement, the sites 150–151 may operate in parallel with each other, on equal stature, with the sites temporarily assuming primary/backup roles for specific data storage and retrieval operations. In any event, the director 104 operates the backup storage site to replicate storage operations performed on the primary storage site. If one storage site experiences a failure, data storage/retrieval requests from the host 102 may still be carried out using the other storage site.

Exemplary Digital Data Processing Apparatus

As mentioned above, the director 104 and controllers 106–107 may be implemented using many different types of hardware. One example is a digital data processing apparatus, which may itself be implemented in various ways, such as the exemplary digital data processing apparatus 200 of FIG. 2. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise RAM and may be used to store the programming instructions executed by the processor 202. The nonvolatile storage 208 may comprise, for example, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the foregoing digital data storage apparatus, a different embodiment of the invention uses logic circuitry to implement the director 104 and/or controllers 106–107 instead of computer-executed instructions. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), and the like.

Operation

In addition to the various hardware embodiments described above, a different aspect of the invention concerns a method for operating a data storage system to store data with an encapsulated metadata token, and to use this information to protect against recalling stale data from base storage in the event of a cache failure.

Signal-Bearing Media

Figure 2:
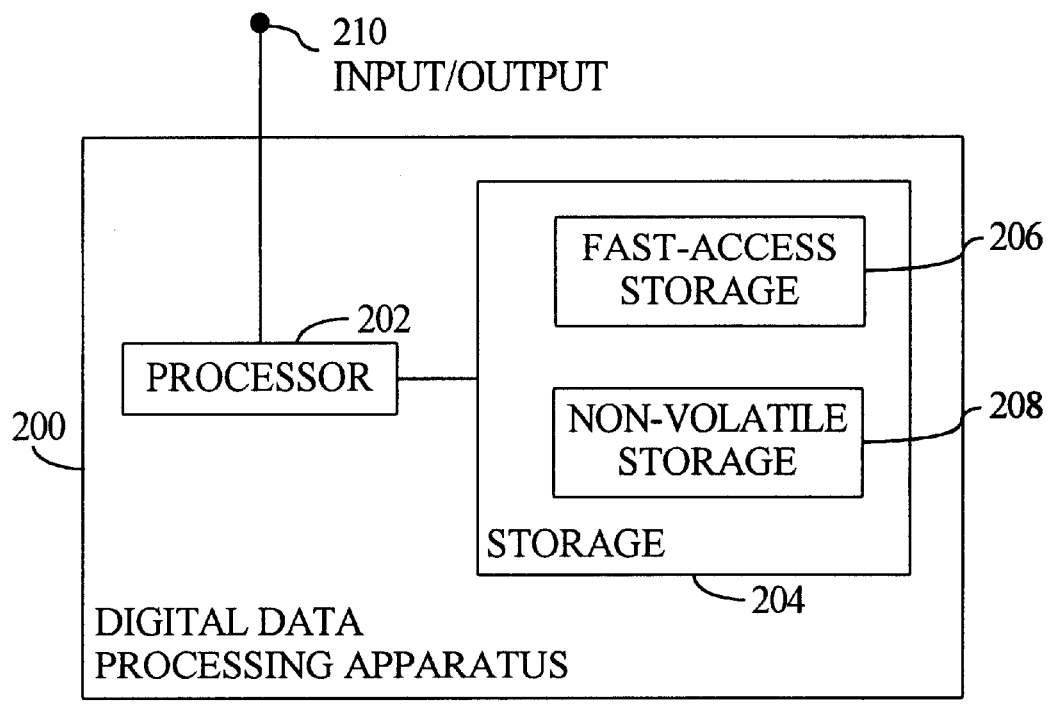
FIG. 2 is a block diagram of a digital data processing machine according to the invention.

In the context of FIGS. 1–2, such a method may be implemented, for example, by operating components such as the director 104 and/or controller(s) 106–107 (each embodying a digital data processing apparatus 200) to execute a sequence of machine-readable instructions. In the absence of a storage failure, the backup controller 107 operates according to a different sequence of instructions (not shown), which primarily serve to copy data objects from the primary storage site 150 to the backup site 151 for backup purposes. The instructions may reside in various types of signal-bearing media. In this respect, one aspect of the present invention concerns a programmed product, comprising signal-bearing media tangibly embodying a program of machine-readable instructions executable by a digital data processor to operate a data storage system to store data with an encapsulated metadata token in base storage, and to use this information to protect against recalling stale data from base storage in the event of a cache failure.

Figure 3:
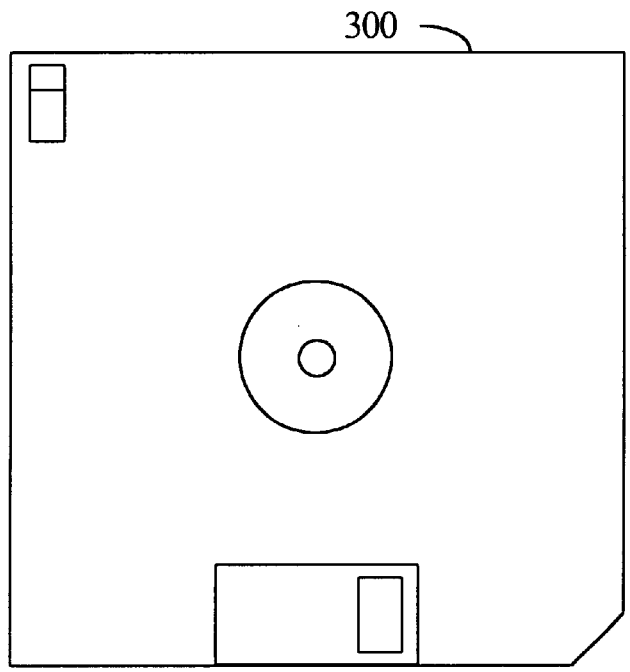
FIG. 3 shows an exemplary signal-bearing medium according to the invention.

This signal-bearing media may comprise, for example, RAM (not shown) contained within the controller 106, as represented by the fast-access storage 206 for example. Alternatively, the instructions may be contained in another signal-bearing media, such as a magnetic data storage diskette 300 (FIG. 3), directly or indirectly accessible by the processor 200. Whether contained in the storage 206, diskette 300, or elsewhere, the instructions may be stored on a variety of machine-readable data storage media, such as direct access storage (e.g., a conventional "hard drive," redundant array of inexpensive disks (RAID), or another direct access storage device (DASD)), magnetic tape, electronic read-only memory (e.g., ROM, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, instead of executing instructions with a processor. In this embodiment, the logic circuitry is implemented in the controller 106, and is configured to perform operations to implement the method of the invention. The logic circuitry may be implemented using many different types of circuitry, as discussed above.

Operational Sequence

Figure 4:
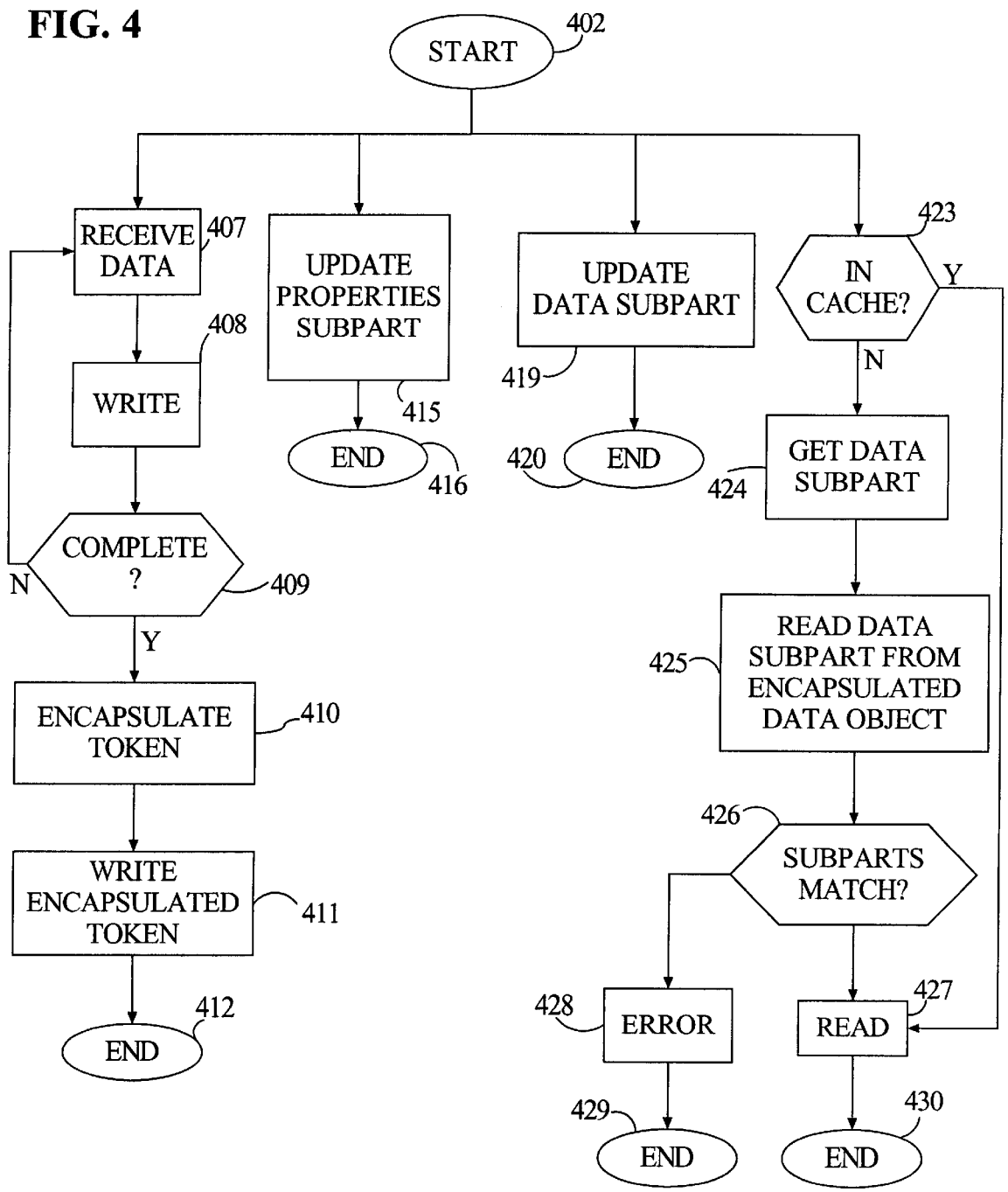
FIG. 4 is a flowchart of an operational sequence for storing and retrieving data that utilize encapsulated tokens according to the invention.

FIG. 4 shows an overall process for operating the data storage system 100, to illustrate one example of the method aspect of the present invention. For ease of explanation, but without any intended limitation, the example of FIG. 4 is described in the context of the structure of FIGS. 1–2, described above.

After the routine 400 begins in step 402, a number of concurrent operations begin. In particular, there is a write sequence 407–412, properties subpart sequence 415–416, data subpart sequence 419–420, and read sequence 423–430. Generally, the write sequence serves to write data objects to the cache 110 and base storage 112. The properties subpart sequence updates data objects' version codes (properties subpart only) when the data objects' non-data properties change. Likewise, the data subpart sequence updates data objects' version codes (data subpart only) when the data objects' underlying data changes. Finally, in the read sequence, the controller 106 reads data from the cache 110 and/or base storage 112.

Write

Considering FIG. 4 in greater detail, the write sequence 406 begins in step 407 where the director 104 receives a data object. Namely, in step 407 the host 102 sends the director 104 a data object and a storage request. The data object may comprise a logical volume, record, file, physical volume, cylinder, logical or physical device, surface, sector, page, byte, bit, or any other appropriate unit of data. Also in step 407, the director 104 forwards the data to the "primary" one of the controllers 106–107. For purposes of illustration, the controller 106 constitutes the primary controller in this example. In step 408, the primary controller 106 writes the data object to its cache 110 and/or base storage 112. Whether data is written to cache, base storage, or both is determined by the controller's pre-programmed data management strategy, which may include various alternatives such as (1) always storing received data objects on cache and occasionally copying or removing cached data objects to base storage, (2) storing received data objects in base storage and only caching the data objects that are most frequently used or likely to be used, (3) another known or novel approach. The controller 106 also makes an entry in the token database 108 in step 408. This entry cross-references the data object with its token, which is discussed in greater detail below. At the very least, the token database lists each data object with its version code data subpart. Copying of the data object between primary and backup storage sites may also occur in step 408, or at another suitable time.

Until step 409 determines that the write operation is complete, step 409 repeats steps 407–408 as necessary. When the write operation finishes, step 409 advances to step 410. In step 410, the controller 106 encapsulates the current data object's token (as updated by steps 415, 419 described below). Encapsulation of the token involves collecting some or all of the various token subcomponents listed in TABLE 1 and combining them into a suitable form for storage. Such encapsulation may entail concatenation, aggregation, encoding the parts together into a unified form, encrypting, etc. Step 411 writes the encapsulated token to the cache 110 and/or base storage 112, along with the data object written in step 408, depending upon the type of data management strategy in place. After step 411, the write sequence 406 ends in step 412.

As an alternative, step 410 may encapsulate the token with its corresponding data object, and write the encapsulated result in step 411. In this case, step 408 buffers received data for subsequent writing to storage in step 411. The data object and token may be encapsulated, for example, by concatenation, aggregation, encoding the parts together into a unified form, encrypting, etc.

Version Code Properties Subpart

The version code properties subpart routine 415–416 is initiated whenever a data object experiences a change to attributes of the data object other than the underlying data.

These attributes include statistics about the data, such as the information shown in TABLE 1. This metadata may change when the controller 106 receives a new or modified data object, or when a data object's characteristics change.

In step 415, the controller 106 first determines whether the current data object is new to the storage site 150. If so, the controller 106 generates a new version code properties subpart for the data object and stores it in the token in the database 108. Otherwise, if the data object is already represented in the cache 110 and/or base storage 112, the controller 106 advances the data object's existing version code properties subpart in its token database 108. As an example, version code advancement may be achieved by alphabetically, numerically, or alphanumerically incrementing the version code properties subpart. Only the properties subpart is advanced in step 415 because this advancement is being performed due to a change in properties rather than a write operation, which would affect the data object's underlying data.

Version Code Data Subpart

The version code data subpart routine 419–420 is initiated whenever the controller 106 receives a data object for storage at the site 150. This data object may be new to the site 150, or it may represent modification to a data object already stored in the cache 110 or base storage 112. The routine 419–420 may be triggered, for example, by the step 407.

In step 419, the controller 106 first determines whether the current data object is new to the storage site 150. If so, the controller 106 generates a new version code data subpart for the data object and stores the new code in the token database 108, cross-referenced against the data object by name or other identity. Otherwise, if the data object is already represented in the cache 110 and/or base storage 112, the controller 106 advances the data object's existing version code data subpart in its token database 108. The data subpart in the token database 108 is advanced in anticipation of the data object's update, to be performed by way of writing to the storage site 150. As an example, this advancement may be achieved by alphabetically, numerically, or alphanumerically incrementing the version code data subpart. Only the data subpart is advanced in step 419 because the present token advancement is being performed due to a write operation, which affects the data object's underlying data rather than properties. The properties subpart is not changed.

Read

The read sequence 423–430 is started when the director 104 receives a read request from the host 102. In response, the director 104 forwards the read request to the primary controller 106, which determines whether the requested data object is stored in cache 110 (step 423). If not, this represents a cache miss, and step 423 advances to step 424. In step 424, the controller 106 reads the data object's version code data subpart from the token database 108. In step 425, the controller 106 reads the data object's encapsulated token from base storage 112 to obtain the data object's version code data subpart. The controller 106 then proceeds to step 426, where it determines whether these data subparts match. Step 426 does not need to consider the version code properties subpart. If the data subparts match, then the data object contained in the base storage 112 is current. This prevents the data object from being deemed "stale" if the data object has experienced various updates that have not affected its data content.

One exemplary situation where non-matching version codes may arise follows. At some early time, the cache 110 and base storage 112 contain the same version of data object. However, the cache 110 may experience several relatively rapid updates before the data object is copied to base storage 112. In this situation, the cache 110 contains a current version of a data object, whereas the base storage 112 contains an older version. Accordingly, the token database 108 contains a token corresponding to the newest version of the data object, i.e., the data object contained in cache 110. In this example, the cache 110 experiences a failure causing the loss of the data object from cache 110. The cache 110 is subsequently repaired, but the lost data object is gone. At this point, the data object on base storage 112 contains an old version code and the token database contains a newer, non-matching version code. The data object in base storage 112 is therefore a "down-level" version.

Referring back to the sequence of FIG. 4, step 426 branches to step 427 if the version code data subparts match. In step 427, the controller 106 reads the data object from base storage 112 and provides the data object as output. After step 427, the program ends (step 430). Otherwise, if step 426 finds that the version code data subparts do not match, then the data object from base storage 112 contains down-level data with respect to the version code data subpart stored in the token database 108. In this event, the data object from base storage 112 is considered stale, and the controller 106 issues an error message (step 428), and the program ends (step 429).

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method of managing a data storage system that includes a cache, base storage, and token database, where the method comprises operations of:
   responsive to the data storage system receiving a data object and an associated write request, performing operations including:
      assigning a version code to the data object;
      in at least one of the cache and the base storage, storing the data object along with information including the version code;
      storing the version code in the token database in association with the data object; and
   responsive to receiving a read request for the data object, performing operations including:
      if the data object is present in the cache, reading the data object from the cache and providing the data object as output;
      if the data object is not present in the cache,
         reading the version code of the data object contained in the base storage and comparing said version code to the version code associated with the data object in the token database; and
         only if the compared version codes match, reading the data object from the data object contained in the base storage and providing the data object as output.

2. The method of claim 1, where:
   the operations further include encapsulating the data object with the information including the version code; and the storing operation comprises storing the encapsulated data object.

3. The method of claim 1, where the operations further include encapsulating said information including the version code prior to the storing operation.

4. The method of claim 1, the operations further comprising:

if the compared version codes do not match, providing an error message.

5. The method of claim 1, the operation of assigning a version code to the data object comprising:

if a previous version of the received data object does not already reside in the data storage system, generating a new version code for the data object;

if a previous version of the received data object already resides in the data storage system, said previous version of the data object having an existing version code, advancing an existing version code of the data object.

6. The method of claim 5, where:

each version code corresponds to one level from a predetermined sequence of increasing levels;

the operation of advancing the existing version code comprises incrementing the version code to the next level in the sequence.

7. The method of claim 1, where:

each version code includes a data subpart and a properties subpart; and the operations include changing the data subpart only when content of the data object is updated in the cache or the base storage, and changing the properties subpart only when prescribed characteristics of the data object are updated without affecting content of the data object in storage.

8. The method of claim 4, where the operation of comparing the version code of the data object contained in storage to the version code associated with the data object in the token database comprises:

comparing the version codes' data subparts without regard to the version codes' properties subparts.

9. The method of claim 1, the base storage being one or more serially accessible data storage media.

10. A signal-bearing medium tangibly embodying a program of machine-readable instructions executable by a digital processing apparatus to perform a method for managing a data storage system that includes a cache, base storage, and token database, where the method comprises operations of:

responsive to the data storage system receiving a data object and an associated write request, performing operations including:
assigning a version code to the data object;
in at least one of the cache and the base storage, storing the data object along with information including the version code;
storing the version code in the token database in association with the data object; and responsive to receiving a read request for the data object, performing operations including:
if the data object is present in the cache, reading the data object from the cache and providing the data object as output;
if the data object is not present in the cache,
reading the version code of the data object contained in the base storage and comparing said version code to the version code associated with the data object in the token database; and only if the compared version codes match, reading the data object from the data object contained in the base storage and providing the data object as output.

11. The medium of claim 10, where:

the operations further include encapsulating the data object with the information including the version code; and the storing operation comprises storing the encapsulated data object.

12. The medium of claim 10, where the operations further include encapsulating said information including the version code prior to the storing operation.

13. The medium of claim 10, the operations further comprising:

if the compared version codes do not match, providing an error message.

14. The medium of claim 10, the operation of assigning a version code to the data object comprising:

if a previous version of the received data object does not already reside in the data storage system, generating a new version code for the data object;

if a previous version of the received data object already resides in the data storage system, said previous version of the data object having an existing version code, advancing an existing version code of the data object.

15. The medium of claim 14, where:

each version code corresponds to one level from a predetermined sequence of increasing levels;

the operation of advancing the existing version code comprises incrementing the version code to the next level in the sequence.

16. The medium of claim 10, where:

each version code includes a data subpart and a properties subpart; and the operations include changing the data subpart only when content of the data object is updated in the cache or the base storage, and changing the properties subpart only when prescribed characteristics of the data object are updated without affecting content of the data object in storage.

17. The medium of claim 13, where the operation of comparing the version code of the data object contained in storage to the version code associated with the data object in the token database comprises:

comparing the version codes' data subparts without regard to the version codes' properties subparts.

18. The medium of claim 10, the base storage being one or more serially accessible data storage media.

19. A logic circuit of multiple interconnected electrically conductive elements configured to perform a method to manage a data storage system that includes a cache, base storage, and token database, the method comprising operations of:

responsive to the data storage system receiving a data object and an associated write request, performing operations including:
assigning a version code to the data object;
in at least one of the cache and the base storage, storing the data object along with information including the version code;
storing the version code in the token database in association with the data object; and responsive to receiving a read request for the data object, performing operations including:

if the data object is present in the cache, reading the data object from the cache and providing the data object as output;

if the data object is not present in the cache,
reading the version code of the data object contained in the base storage and comparing said version code to the version code associated with the data object in the token database; and only if the compared version codes match, reading the data object from the data object contained in the base storage and providing the data object as output.

20. A data storage system, comprising:

cache storage;

base storage;

a token database; and a controller coupled to the cache storage, base storage, and token database, where the controller is configured to perform operations to manage data storage in the cache and base storage, the operations comprising:

responsive to the data storage system receiving a data object and an associated write request, performing operations including:
assigning a version code to the data object;
in at least one of the cache and the base storage, storing the data object along with information including the version code;
storing the version code in the token database in association with the data object: and responsive to receiving a read request for the data object, performing operations including:
if the data object is present in the cache, reading the data object from the cache and providing the data object as output;
if the data object is not present in the cache,
reading the version code of the data object contained in the base storage and comparing said version code to the version code associated with the data object in the token database; and
only if the compared version codes match, reading the data object from the data object contained in the base storage and providing the data object as output.

21. The system of claim 20, where the controller is configured such that:
the operations further include encapsulating the data object with the information including the version code; and
the storing operation comprises storing the encapsulated data object.

22. The system of claim 20, where the controller is configured such that the operations further include encapsulating said information including the version code prior to the storing operation.

23. The system of claim 20, the controller being configured such that the operations further comprise:
if the compared version codes do not match, providing an error message.

24. The system of claim 20, the controller being configured such that the operation of assigning a version code to the data object comprises:
if a previous version of the received data object does not already reside in the data storage system, generating a new version code for the data object,
if a previous version of the received data object already resides in the data storage system, said previous version of the data object having an existing version code, advancing an existing version code of the data object.

25. The system of claim 24, where the controller is configured such that:
each version code corresponds to one level from a predetermined sequence of increasing levels;
the operation of advancing the existing version code comprises incrementing the version code to the next level in the sequence.

26. The system of claim 20, where the controller is configured such that:
each version code includes a data subpart and a properties subpart; and
the operations include changing the data subpart only when content of the data object is updated in the cache or the base storage, and changing the properties subpart only when prescribed characteristics of the data object are updated without affecting content of the data object in storage.

27. The system of claim 23, where the controller is configured such that the operation of comparing the version code of the data object contained in storage to the version code associated with the data object in the token database comprises:
comparing the version codes' data subparts without regard to the version codes' properties subpart.

28. The system of claim 20, the base storage being one or more serially accessible data storage media.

29. A data storage system, comprising:

cache storage;

base storage;

a token database; and controller means, coupled to the cache storage, base storage, and token database, for managing data storage in the cache and base storage by:
responsive to the data storage system receiving a data object and an associated write request, performing operations including:
assigning a version code to the data object;
in at least one of the cache and the base storage, storing the data object along with information including the version code;
storing the version code in the token database in association with the data object; and
responsive to receiving a read request for the data object, performing operations including:
if the data object is present in the cache, reading the data object from the cache and providing the data object as output;
if the data object is not present in the cache,
reading the version code of the encapsulated data object contained in the base storage and comparing said version code to the version code associated with the data object in the token database; and
only if the compared version codes match, reading the data object from the encapsulated data object contained in the base storage and providing the data object as output.

30. A method of managing a data storage system that includes a cache and base storage to prevent recalling stale data from the base storage in the event of a cache failure, the method comprising operations of:

responsive to the data storage system receiving data objects and associated write requests from one or more hosts, performing the following operations for each subject data object;
assigning a version code to the subject data object, the version code distinguishing the data object from other data objects that comprise versions of the same item of data as the subject data object;
in at least one of the cache and the base storage, storing the subject data object along with information including the version code;
storing the version code in a version-code-database in association with the subject data object; and
responsive to receiving one or more hosts' read requests for data objects, performing the following operations for each such read request:
if the requested data object is present in the cache, reading the requested data object from the cache and outputting the requested data object to the requesting host;
if the requested data object is not present in the cache, reading the version code stored along with the requested data object contained in the base storage and comparing said version code to the version code associated with the requested data object in the version-code-database; and
only if the compared version codes match, reading the requested data object from the base storage and providing the requesting host with an output of the data object read from the base storage.

31. A signal-bearing medium tangibly embodying a program of machine-readable instructions executable by a digital processing apparatus to perform operations for managing a data storage system that includes a cache and base storage to prevent recalling stale data from the base storage in the event of a cache failure, the operations comprising:
responsive to the data storage system receiving data objects and associated write requests from one or more hosts, performing the following operations for each subject data object;
assigning a version code to the subject data object, the version code distinguishing the data object from other data objects that comprise versions of the same item of data as the subject data object;
in at least one of the cache and the base storage, storing the subject data object along with information including the version code;
storing the version code in a version-code-database in association with the subject data object; and
responsive to receiving one or more hosts' read requests for data objects, performing the following operations for each such read request:
if the requested data object is present in the cache, reading the requested data object from the cache and outputting the requested data object to the requesting host;
if the requested data object is not present in the cache, reading the version code stored along with the requested data object contained in the base storage and comparing said version code to the version code associated with the requested data object in the version-code-database; and
only if the compared version codes match, reading the requested data object from the base storage and providing the requesting host with an output of the data object read from the base storage.

32. A data storage system, comprising:

cache storage;

base storage;

a version-code-database;

a controller programmed to perform operations to prevent recalling stale data from the base storage in the event of a cache failure, the operations comprising:
responsive to receiving data objects and associated write requests from one or more hosts, performing the following operations for each subject data object;
assigning a version code to the subject data object, the version code distinguishing the data object from other data objects that comprise versions of the same item of data as the subject data object;
in at least one of the cache and the base storage, storing the subject data object along with information including the version code;
storing the version code in the version-code-database in association with the subject data object; and
responsive to receiving one or more hosts' read requests for data objects, performing the following operations for each such read request:
if the requested data object is present in the cache, reading the requested data object from the cache and outputting the requested data object to the requesting host;
if the requested data object is not present in the cache,
reading the version code stored along with the requested data object contained in the base storage and comparing said version code to the version code associated with the requested data object in the version-code-database; and
only if the compared version codes match, reading the requested data object from the base storage and providing the requesting host with an output of the data object read from the base storage.

* * * * *

UNITED STATES PATENT AND TRADEMARK OFFICE
CERTIFICATE OF CORRECTION

PATENT NO.     : 6,502,108 B1
DATED          : December 31, 2002
INVENTOR(S)    : Kenneth Fairclough Day, III et al.

It is certified that error appears in the above-identified patent and that said Letters Patent is hereby corrected as shown below:

<u>Column 13,</u>
Line 29, delete the colon ":" between "data object" and "and responsive to".
Line 65, delete the comma "," following "data object" and replace with a semicolon -- ; --.

Signed and Sealed this

Seventeenth Day of June, 2003

JAMES E. ROGAN
*Director of the United States Patent and Trademark Office*